US 6,834,115 B2

(12) United States Patent
Maurer et al.

(10) Patent No.: US 6,834,115 B2
(45) Date of Patent: Dec. 21, 2004

(54) METHOD FOR OPTIMIZING OFF-LINE FACIAL FEATURE TRACKING

(75) Inventors: Thomas Maurer, Los Angeles, CA (US); Hartmut Neven, Santa Monica, CA (US); Bjoern Poehlker, Venice, CA (US)

(73) Assignee: Nevengineering, Inc., Santa Monica, CA (US)

( * ) Notice: Subject to any disclaimer, the term of this patent is extended or adjusted under 35 U.S.C. 154(b) by 613 days.

(21) Appl. No.: 09/929,294

(22) Filed: Aug. 13, 2001

(65) Prior Publication Data

US 2003/0031344 A1 Feb. 13, 2003

(51) Int. Cl.$^7$ .................................................. G06K 9/00
(52) U.S. Cl. ........................ 382/103; 382/107; 382/118; 382/209; 348/169; 345/706
(58) Field of Search ................................ 382/103, 118, 382/291, 209, 107, 236, 248; 348/169; 352/50, 87; 345/473, 706, 861, 957, 419

(56) References Cited

U.S. PATENT DOCUMENTS

| | | |
|---|---|---|
| 4,725,824 A | 2/1988 | Yoshioka |
| 4,805,224 A | 2/1989 | Koezuka et al. |
| 4,827,413 A | 5/1989 | Baldwin et al. |
| 5,159,647 A | 10/1992 | Burt |
| 5,168,529 A | 12/1992 | Peregrim et al. |
| 5,187,574 A | 2/1993 | Kosemura et al. |
| 5,220,441 A | 6/1993 | Gerstenberger |
| 5,280,530 A | 1/1994 | Trew et al. |
| 5,333,165 A | 7/1994 | Sun |
| 5,383,013 A | 1/1995 | Cox |
| 5,430,809 A | 7/1995 | Tomitaka |
| 5,432,712 A | 7/1995 | Chan |
| 5,511,153 A | 4/1996 | Azarbayejani et al. |
| 5,533,177 A | 7/1996 | Wirtz et al. |
| 5,550,928 A | 8/1996 | Lu et al. |
| 5,581,625 A | 12/1996 | Connell |
| 5,588,033 A | 12/1996 | Yeung |
| 5,680,487 A | 10/1997 | Markandey |
| 5,699,449 A | 12/1997 | Javidi |
| 5,714,997 A | 2/1998 | Anderson |

(List continued on next page.)

FOREIGN PATENT DOCUMENTS

| | | |
|---|---|---|
| DE | 4406020 C1 | 6/1995 |
| EP | 0807902 A2 | 11/1997 |
| WO | WO99/53443 | 10/1999 |

OTHER PUBLICATIONS

King et al, Automatic face location detection and tracking for moel based video coding, 1996, pp. 1098–1101.*
Notification of Transmittal of the International Search Report or the Declaration, International Search Report for PCT/US02/23973, mailed Nov. 18, 2002.

(List continued on next page.)

Primary Examiner—Bhavesh M. Mehta
Assistant Examiner—Barry ChooBin
(74) Attorney, Agent, or Firm—Robroy R. Fawcett

(57) ABSTRACT

The present invention relates to a technique for optimizing off-line facial feature tracking. Facial features in a sequence of image frames are automatically tracked while a visual indication is presented of the plurality of tracking node locations on the respective image frames. The sequence of image frames may be manually paused at a particular image frame in the sequence of image frames if the visual indication of the tracking node locations indicates that at least one location of a tracking node for a respective facial feature is not adequately tracking the respective facial feature. The location of the tracking node may be reinitialized by manually placing the tracking node location at a position on the particular image frame in the monitor window that corresponds to the respective facial feature. Automatic tracking of the facial feature may be continued based on the reinitialized tracking node location.

5 Claims, 3 Drawing Sheets

U.S. PATENT DOCUMENTS

| | | | |
|---|---|---|---|
| 5,715,325 A | | 2/1998 | Bang et al. |
| 5,719,954 A | | 2/1998 | Onda |
| 5,736,982 A | | 4/1998 | Suzuki et al. |
| 5,764,803 A | | 6/1998 | Jacquin et al. |
| 5,774,591 A | | 6/1998 | Black et al. |
| 5,802,220 A | | 9/1998 | Black et al. |
| 5,809,171 A | | 9/1998 | Neff et al. |
| 5,828,769 A | | 10/1998 | Burns |
| 5,917,937 A | | 6/1999 | Szeliski et al. |
| 5,982,853 A | | 11/1999 | Liebermann |
| 5,995,119 A | | 11/1999 | Cosatto et al. |
| 6,011,562 A | | 1/2000 | Gagné |
| 6,031,539 A | * | 2/2000 | Kang et al. ............... 345/419 |
| 6,044,168 A | | 3/2000 | Tuceryan et al. |
| 6,047,078 A | * | 4/2000 | Kang ...................... 382/107 |
| 6,052,123 A | * | 4/2000 | Lection et al. ............ 345/419 |
| 6,331,853 B1 | * | 12/2001 | Miyashita ................. 345/427 |
| 6,353,437 B1 | * | 3/2002 | Gagne ..................... 345/473 |
| 6,714,661 B2 | * | 3/2004 | Buddenmeier et al. ..... 382/103 |
| 2002/0067362 A1 | * | 6/2002 | Agostino Nocera et al. .................... 345/473 |
| 2002/0136435 A1 | * | 9/2002 | Prokoski .................. 382/118 |
| 2003/0007666 A1 | * | 1/2003 | Stewartson et al. ........ 382/103 |
| 2003/0169907 A1 | * | 9/2003 | Edwards et al. ........... 382/118 |
| 2004/0012594 A1 | * | 1/2004 | Gauthier et al. ........... 345/473 |

OTHER PUBLICATIONS

Valente, Stephanie et al., "A Visual Anaylsis/Synthesis Feedback Loop for Accurate Face Tracking", Signal Processing Image Comunication, Elsevier Science Publishers, vol. 16, No. 6, Feb. 2001, pp. 585–608.

Yang, Tzong Jer, "Face Analysis and Synthesis", Jun. 1, 1999, Retrieved from Internet, http://www.cmlab.csie,ntu.edu.tw/ on Oct. 25, 2002, 2 pg.

Yang, Tzong Jer, "VR–Face: An Operator Assisted Real-Time Face Tracking System", Communication and Multimedia Laboratory, Dept. of Computer Science and Information Engineering, National Taiwan University, Jun. 1999, pp. 1–6.

International Search Report for PCT/US99/07935.

Akimoto, T., et al., "Automatic Creation of Facial 3D Models", IEEE Computer Graphics & Apps., pp. 16–22, Sep. 1993.

Ayache, N. et al., "Rectification of Images for Binocular and Trinocular Stereovision", Proc. Of 9th Int'l., Conference on Pattern Recognition, 1, pp. 11–16, Italy, 1988.

Belhumeur, P., "A Bayesian Approach to Binocular Stereopsis", *Int'l. J. Of Computer Vision*, 19 (3), pp. 237–260, 1996.

Beymer, D. J., "Face Recognition Under Varying Pose", MIT A.I. Lab, Memo No. 1461,pp. 1–13, 12/93.

Beymer, D.J., "Face Recognition Under Varying Pose", MIT A.I. Lab. Research Report, 1994, pp. 756–761.

Buhman, J. et al., "Distortion Invariant Object Recognition By Matching Hierarchically Labeled Graphs", In Proceedings IJCNN Int'l Conf. Of Neural Networks, Washington, D.C. Jun. 1989, pp. 155–159.

DeCarlo, D., et al., "The integration of Optical Flow and Deformable Models with Applications to Human Face Shape and Motion Estimation", pp. 1–15, In Proc. CVPR '96, pp. 231–238 (published)[TM Sep. 18, 1996].

Devemay, F. et al., "Computing Differential Properties of 3–D Shapes from Steroscopic Images without {3–D} Models", INRIA, RR–2304, pp. 1–28, Sophia, Antipolis, 1994.

Dhond, U., "Structure from Stereo: a Review", IEEE Transactions on Systems, Man, and Cybernetics, 19(6), pp. 1489–1510, 1989.

Fleet, D.J., et al., "Computation of Component Image Velocity from Local Phase Information", *Int., J. Of Computer Vision*, 5:1, pp. 77–104 (1990).

Fleet, D.J., et al. *Measurement of Image Velocity*, Kluwer Academic Press, Boston, pp. I–203, 1992.

Hall, E.L., "Computer Image Processing And Recognition", Academic Press 1979, 99. 468–484.

Hong, H.,et al., "Online Facial Recognition based on Personalized Gallery", Proceedings of Int'l Conference On Automatic Face And Gesture Recognition, pp. 1–6, Japan Apr. 1997.

Kolocsai, P., et al, Statistical Analysis of Gabor–Filter Representation, *Proceedings of International Conference on Automatic Face and Gesture Recognition*, 1997, 4 pp.

Kruger, N., "Visual Learning with a priori Constraints", *Shaker Verlag*, Aachen, Germany, 1998, pp. 1–131.

Kruger, N., et al, "Principles of Cortical Processing Applied to and Motivated by Artificial Object Recognition", Institut fur Neuroinformatik, *Internal Report 97–17*, Oct. 97, pp. 1–12.

Kruger, N., et al, "Autonomous Learning of Object Representations Utilizing Self–Controlled Movements", 1998, *Proceedings of NN98*, 5 pp.

Kruger, N., et al, "Object Recognition with a Sparse and Autonomously Learned Representation Based on Banana Wavelets", *Internal Report 96–11*, Institut fur Neuroinformatik, Dec. 96, pp. 1–24.

Kruger, N., et al, "Object Recognition with Banana Wavelets", *European Symposium on Artificial Neural Networks* (ESANN97), 1997, 6 pp.

Kruger, N., "An Algorithm for the Learning of Weights in Discrimination Functions Using a priori Constraints", *IEEE Transactions on Pattern Analysis and Machine Intelligence*, vol. 19, No. 7, Jul. 1997, pp. 764–768.

Lades, M., et al, "Distortion Invarient Object Recognition in the Dynamic Link Architecture", *IEEE Transactions on Computers*, vol. 42, No. 3, 1993, 11 pp.

Luong, Q. T., et al, "The Fundamental Matrix, Theory, Algorithm, and Stability Analysis", *INRIA*, 1993, pp. 1–46.

Manjunath, B. S., et al, "A Feature Based Approach to Face Recognition", *In Proceedings IEEE Conference on Computer Vision and Pattern Recognition*, pp. 373–378, 3/92.

Mauer, T., et al, "Single–View Based Recognition of Faces Rotated in Depth", In *Proceedings of the International Workshop on Automatic Face and Gesture Recognition*, pp. 248–253, Zurich, CH, Jun. 26, 1995.

Mauer, T., et al, "Learning Feature Transformations to Recognize Faces Rotated in Depth", In *Proceedings of the International Conference on Artificial Neural Networks*, vol. 1, pp. 353–358, Paris, France, Oct. 9–13, 1995.

Mauer, T., et al, "Tracking and Learning Graphs and Pose on Image Sequences of Faces", *Proceedings of 2nd International Conference on Automatic Face and Gesture Recognition*, Oct. 14–16, 1996, pp. 176–181.

Maybank, S. J., et al, "A Theory of Self–Calibration of a Moving Camera", *International Journal of Computer Vision*, 8(2), pp. 123–151, 1992.

McKenna, S.J., et al, Tracking Facial Feature Points With Gabor Wavelets and Shape Models, (publication & date unknown), 6 pp.

Okada, K., et al, "The Bochum/USC Face Recognition System", 19 pp. (publication & date unknown).

Okutomi, M., et al, "A Multiple–Baseline Stereo", *IEEE Trans. on Pattern Analysis and Machine Intelligence*, vol. 15, No. 4, pp. 353–363, Apr. 1993.

Peters, G., et al, "Learning Object Representations by Clustering Banana Wavelet Responses", *Tech. Report IR–INI 96–09*, Institut fur Neuroinformatik, Ruhr Universitat, Bochum, 1996, 6 pp.

Phillips, P. J., et al, "The Face Recognition Technology (FERET) Program", *Proceedings of Office of National Drug Control Policy*, CTAC International Technology Symposium, Aug. 18–22, 1997, 10 pages.

Pighin, F, et al, "Synthesizing Realistic Facial Expressions from Photographs", In *SIGGRAPH 98 Conference Proceedings*, pp. 75–84, Jul. 1998.

Roy, S., et al, "A Maximum Flow Formulation of the N–Camera Stereo Correspondence Problem", *IEEE, Proceedings of International Conference on Computer Vision*, Bombay, India, Jan. 1998, pp. 1–6.

Sara, R. et al "3–D Data Acquision and Interpretation for Virtual Reality and Telepresence", *Proceedings IEEE Workshop Computer Vision for Virtual Reality Based Human Communication*, Bombay, Jan. 1998, 7 pp.

Sara, R. et al "Fish–Scales: Representing Fuzzy Manifolds", *Proceedings International Conference Computer Vision*, ICCV '98, pp. 811–817, Bombay, Jan. 1998.

Sara, R., et al, "On Occluding Contour Artifacts in Stereo Vision", *IEEE, Proceedings of International Conference Computer Vision and Pattern Recognition*, Puerto Rico, 1997, 6 pp.

Steffens, J., et al, "PersonSpotter—Fast and Robust System for Human Detection, Tracking, and Recognition", *Proceedings of International Conference on Automatic Face and Gesture Recognition*, 6 pp., Japan—Apr. 1998.

Theimer, W. M., et al, "Phase–Based Binocular Vergence Control and Depth Reconstruction using Active Vision", *CVGIP: Image Understanding*, vol. 60, No. 3, Nov. 1994, pp. 343–358.

Tomasi, C., et al., "Stereo Without Search", *Proceedings of European Conference on Computer Vision*, Cambridge, UK, 1996, 14 pp. (7 sheets).

Triesch, J., et al, "Robust Classification of Hand Postures Against Complex Backgrounds", *Proceedings of the Second International Conference on Automatic Face and Gesture Recognition*, Killington, VT, Oct. 1996, 6 pp.

Turk, M., et al, "Eigenfaces for Recognition", *Journal of Cognitive Neuroscience*, vol. 3, No. 1, pp. 71–86, 1991.

Wiskott, L., et al, "Face Recognition and Gender Determination", *Proceedings of International Workshop on Automatic Face and Gesture Recognition*, pp. 92–97, Zurich CH, Jun. 26, 1995.

Wiskott, L., et al, "Face Recognition by Elastic Bunch Graph Matching", *Internal Report, IR–INI 96–08*, Institut fur Neuroinformatik, Ruhr–Universitat, Bochum, pp. 1–21, Apr. 1996.

Wiskott, L., "Labeled Graphs and Dynamic Link Matching for Face Recognition and Scene Analysis", *Verlag Harr Deutsch*, Thun–Frankfurt am Main. Reihe Physik, Dec. 1995, pp. 1–109.

Wiskott, L., "Phanton Faces for Face Analysis", *Proceedings of 3rd Joint Symposium on Neural Computation*, Pasadena, CA, vol. 6, pp. 46–52, Jun. 1996.

Wiskott, L., "Phanton Faces for Face Analysis", *Internal Report, IR–INI 96–06*, Institut fur Neoroinformatik, Ruhr–Universitat, Bochum, Germany, Apr. 1996, 12 pp.

Wiskott, L. "Phanton Faces for Face Analysis", *Pattern Recognition*, vol. 30, No. 6, pp. 837–846, 1997.

Wiskott, L., et al, "Face Recognition by Elastic Bunch Graph Matching", *IEEE Transactions on Pattern Analysis and Machine Intelligence*, 19(7), pp. 775–779, 1997.

Wong, R., et al, "PC–Based Human Face Recognition System", *IEEE*, pp. 641–644, 1992.

Wurtz, R., "Object Recognition Robust Under Translations, Deformations, and Changes in Background", *IEEE Transactions on Patern Analysis and Machine Intelligence*, vol. 19, No. 7, Jul. 1997, pp. 769–775.

Wurtz, R., et al, "Corner Detection in Color Images by Multiscale Combination of End–stopped Cortical Cells", *Artificial Neural Networks—ICANN '97*, Lecture Notes in Computer Science, vol. 1327, pp. 901–906, Springer–Verlag, 1997.

Yao, Y., et al, "Tracking a Dynamic Set of Feature Points", *IEEE Transactions on Image Processing*, vol. 4, No. 10, Oct., 1995, pp. 1382–1394.

* cited by examiner

METHOD FOR OPTIMIZING OFF-LINE FACIAL FEATURE TRACKING

BACKGROUND OF THE INVENTION

The present invention relates to avatar animation, and more particularly, to facial feature tracking.

Animation of photo-realistic avatars or of digital characters in movie or game production generally requires tracking of an actor's movements, particularly for tracking facial features. Accordingly, there exists a significant need for improved facial feature tracking. The present invention satisfies this need.

SUMMARY OF THE INVENTION

The present invention is embodied in a method, and related apparatus, for optimizing off-line facial feature tracking. In the method a monitor window is provided that has a visual indication of a plurality of tracking node locations with respect to facial features in a sequence of image frames. The monitor window has a control for pausing at an image frame in the sequence of image frames. The facial features in the sequence of image frames are automatically tracked while the visual indication is presented of the plurality of tracking node locations on the respective image frames. The sequence of image frames may be manually paused at a particular image frame in the sequence of image frames if the visual indication of the tracking node locations indicates that at least one location of a tracking node for a respective facial feature is not adequately tracking the respective facial feature. The location of the tracking node may be reinitialized by manually placing the tracking node location at a position on the particular image frame in the monitor window that corresponds to the respective facial feature. Automatic tracking of the facial feature may be continued based on the reinitialized tracking node location.

In other more detailed features of the invention, the tracking of facial features in the sequence of facial image frames of the speaking actor may performed using bunch graph matching, or using transformed facial image frames generated based on wavelet transformations, such as Gabor wavelet transformations.

Other features and advantages of the present invention should be apparent from the following description of the preferred embodiments taken in conjunction with the accompanying drawings, which illustrate, by way of example, the principles of the invention.

DETAILED DESCRIPTION OF THE PREFERRED EMBODIMENTS

The present invention provides a technique for optimizing facial feature tracking for extraction of animation values or parameters. Automatic extraction generally increases the speed and reduces the tedium associated with the extraction task. Manual intervention permits correction of tracking inaccuracies or imperfections that may reduce the desirability of automatic extraction.

Figure 1:
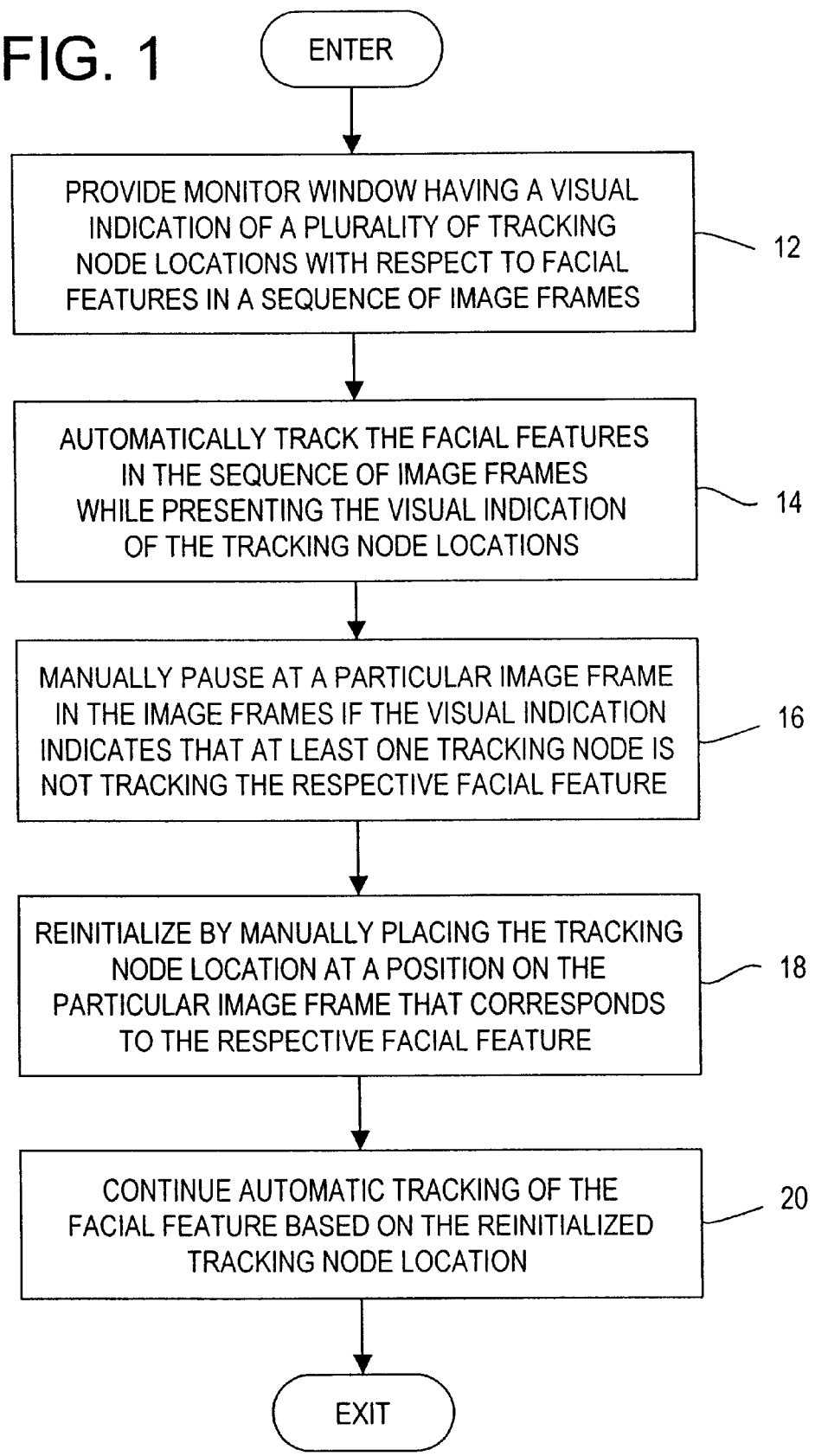
FIG. 1 is a flow diagram for illustrating a method for optimizing off-line facial feature tracking using manual reinitialization of track node location, according to the present invention.
Figure 2:
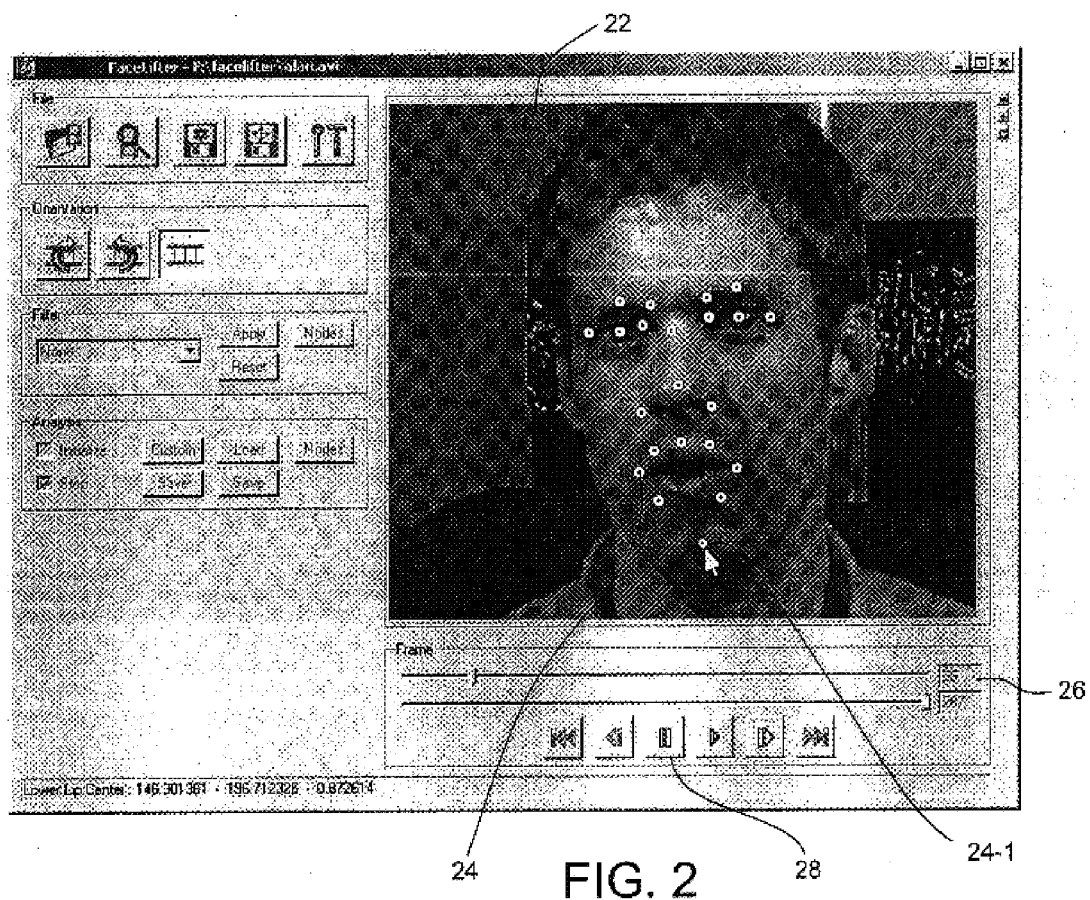
FIG. 2 is a schematic diagram of a monitor window for providing a visual indication of a plurality of tracking node locations with respect to facial features in a sequence of image frames for use in the method for off-line facial feature tracking of FIG. 1.
Figure 3:
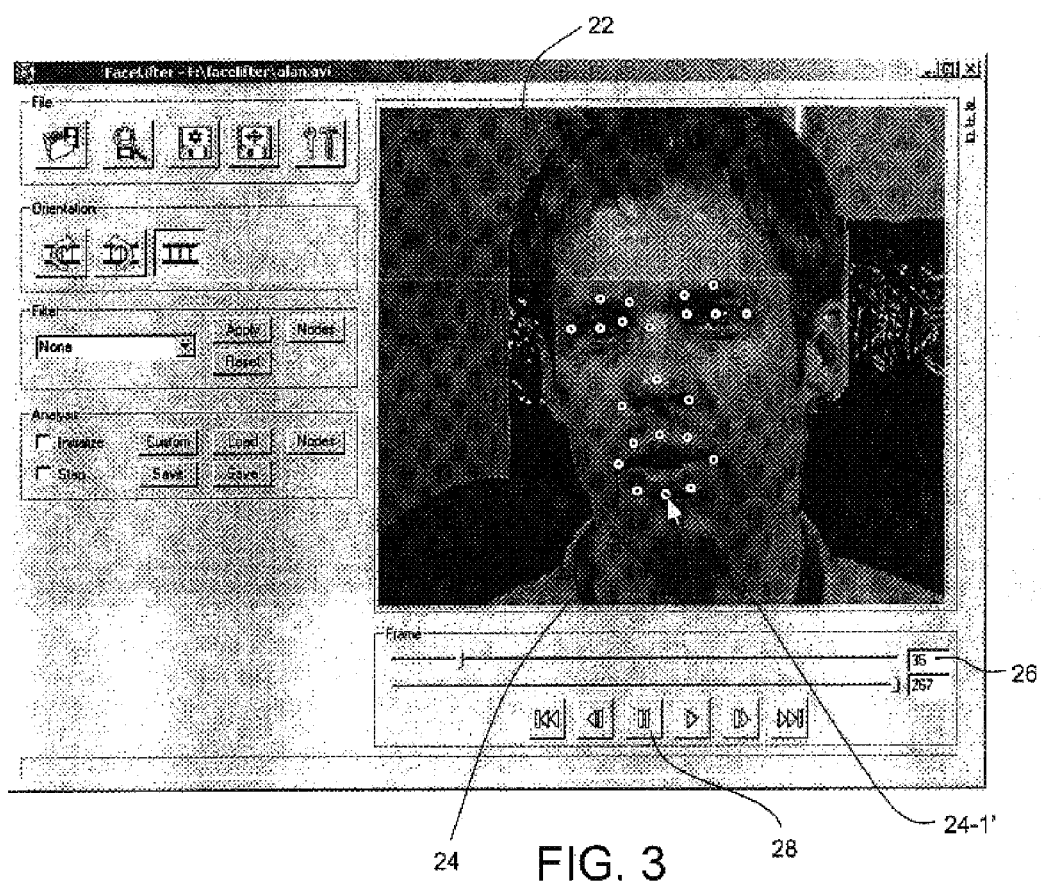
FIG. 3 is a schematic diagram of a monitor window for providing a visual indication of a plurality of tracking node locations with respect to facial features in a sequence of image frames for use in the method for optimizing off-line facial feature tracking of FIG. 1.

With reference to FIG. 1, the invention may be embodied in a method, and related apparatus, for optimizing off-line facial feature tracking. In the method, a monitor window 22 is provided that has a visual indication of a plurality of tracking node locations 24 with respect to facial features in a sequence of image frames 26 (step 12). The monitor window has a control 28 for pausing at an image frame in the sequence of image frames. The facial features in the sequence of image frames are automatically tracked while the visual indication is presented of the plurality of tracking node locations on the respective image frames (step 14). The sequence of image frames may be manually paused at a particular image frame in the sequence of image frames if the visual indication of the tracking node locations indicates that at least one location 24-1 of a tracking node for a respective facial feature is not adequately tracking the respective facial feature (step 16). The location of the tracking node may be reinitialized by manually placing the tracking node location at a position 24-1' on the particular image frame in the monitor window that corresponds to the respective facial feature (step 18). Automatic tracking of the facial feature may be continued based on the reinitialized tracking node location (step 20).

The tracking of facial features in the sequence of facial image frames of the speaking actor may performed using bunch graph matching, or using transformed facial image frames generated based on wavelet transformations, such as Gabor wavelet transformations. Wavelet-based tracking techniques are described in U.S. Pat. No. 6,272,231. The entire disclosure of U.S. Pat. No. 6,272,231 is hereby incorporated herein by reference. The techniques of the invention may be accomplished using generally available image processing systems.

The manual intervention allows scalability of the animation tracking. For high quality animation, frequent manual interaction may be employed to insure accurate tracking. For lower quality animation, manual interaction may be employed less frequently for correcting only significant inconsistencies.

Although the foregoing discloses the preferred embodiments of the present invention, it is understood that those skilled in the art may make various changes to the preferred embodiments without departing from the scope of the invention. The invention is defined only by the following claims.

We claim:

1. Method for optimizing off-line facial feature tracking, comprising the steps for:

providing a monitor window that has a visual indication of a plurality of tracking node locations with respect to facial features in a sequence of image frames, the monitor window having a control for pausing at an image frame in the sequence of image frames;

automatically tracking the facial features in the sequence of image frames while presenting the visual indication of the plurality of tracking node locations on the respective image frames;

manually pausing the sequence of image frames at a particular image frame in the sequence of image frames if the visual indication of the tracking node locations indicates that at least one location of a tracking node for a respective facial feature is not adequately tracking the respective facial feature;

reinitializing the at least one location of the tracking node by manually placing the tracking node location at a position on the particular image frame in the monitor window that corresponds to the respective facial feature; and continuing automatic tracking of the facial feature based on the reinitialized at least one tracking node location.

2. Method for optimizing off-line facial feature tracking as defined in claim 1, wherein the tracking of facial features in the sequence of facial image frames of the speaking actor is performed using bunch graph matching.

3. Method for optimizing off-line facial feature tracking as defined in claim 1, wherein the tracking of facial features in the sequence of facial image frames of the speaking actor is performed using transformed facial image frames generated based on wavelet transformations.

4. Method for optimizing off-line facial feature tracking as defined in claim 1, wherein the tracking of facial features in the sequence of facial image frames of the speaking actor is performed using transformed facial image frames generated based on Gabor wavelet transformations.

5. Apparatus for optimizing off-line facial feature tracking, comprising:

a monitor window means for providing a visual indication of a plurality of tracking node locations with respect to facial features in a sequence of image frames, the monitor window having a control for pausing at an image frame in the sequence of image frames;

means for automatic tracking of the facial features in the sequence of image frames while presenting the visual indication of the plurality of tracking node locations on the respective image frames;

means for manually pausing the sequence of image frames at a particular image frame in the sequence of image frames if the visual indication of the tracking node locations indicates that at least one location of a tracking node for a respective facial feature is not adequately tracking the respective facial feature;

means for reinitializing the at least one location of the tracking node by manually placing the tracking node location at a position on the particular image frame in the monitor window that corresponds to the respective facial feature; and means for continuing automatic tracking of the facial feature based on the reinitialized at least one tracking node location.

* * * * *